United States Patent [19]
Cargagna

[11] 3,819,562
[45] June 25, 1974

[54] COATING SOLUTION OF CITRIC ACID, MALONIC ACID, OR THE ACID ESTER OF CITRIC OF MALONIC ACID AND A SELECTED POLYHYDROXY ALIPHATIC ACID; AND A SELECTED FLUOROOLEFIN COPOLYMER

[75] Inventor: Paul D. Cargagna, Wilmington, Del.

[73] Assignee: E. I. du Pont de Nemours and Company, Wilmington, Del.

[22] Filed: Dec. 4, 1972

[21] Appl. No.: 311,978

[52] U.S. Cl. .................... 260/33.4 R, 260/78.4 D
[51] Int. Cl. ........................ C08f 45/34, C08f 3/52
[58] Field of Search ................. 260/78.4 D, 33.4 R

[56] References Cited
UNITED STATES PATENTS

| | | | |
|---|---|---|---|
| 3,035,011 | 5/1962 | Bartl et al. | 260/78.4 D |
| 3,220,991 | 11/1965 | Martins | 260/78.4 D |
| 3,514,425 | 5/1970 | Engelhardt | 260/827 |

*Primary Examiner*—Allan Lieberman
*Assistant Examiner*—S. L. Fox

[57] ABSTRACT

Coating solution of certain multicarboxylic acids, e.g., citric acid and certain reactive copolymers, e.g., copolymers containing hydroxyl groups or glycidyl groups, that yields an adherent, transparent, hydrolysis-resistant, abrasion-resistant, thermoformable coating, when cured at moderate temperatures for relatively short times.

12 Claims, No Drawings

A COATING SOLUTION OF CITRIC ACID, MALONIC ACID, OR THE ACID ESTER OF CITRIC OF MALONIC ACID AND A SELECTED POLYHYDROXY ALIPHATIC ACID; AND A SELECTED FLUOROOLEFIN COPOLYMER

This invention relates to a coating composition useful to render substrates mar resistant, yet thermoformable. The coating composition can be cured at moderate temperatures for relatively short times thus giving an economic advantage over some of the previously known coating compositions.

Many compositions are known in the prior art to be useful in coating substrates to produce mar resistant products. One known coating composition useful for coating such substrates as polymethyl methacrylate and polycarbonate is based on the reaction of polysilic acid and a multihydroxy fluorocarbon copolymer. This coating system and its various improvements is the subject of several U.S. Pats. Nos. including 3,429,845; 3,429,846; and 3,390,202.

The coating compositions of the present invention possess some advantages over those previously known, namely, the coating compositions cure at lower temperatures at shorter times, the coating is more hydrolytically stable, i.e., the coating is less affected by contact with water. The coating is more flexible and therefore coated articles especially thermoplastic articles can be shaped, for example, by vacuum forming after the coating is cured with substantially less likelihood of the coating cracking.

The coating solution of the present invention contains a multicarboxylic acid, a preformed organic copolymer that is reactive with the acid and preferably an esterification catalyst. Suitable multicarboxylic acids are citric acid, malonic acid and the acid ester reaction product of citric acid or malonic acid and a polyhydroxy aliphatic acid having up to 6 carbon atoms in which the mol ratio of citric acid and malonic acid to polyhydroxy aliphatic acid is greater than 0.5 to 1. In the acid ester reaction products the ratio of citric acid or malonic acid to the polyhydroxy aliphatic acid can be much higher than 0.5 to 1, but at the level of 5 or 6 to 1, the result is not substantially different from the result obtained using only citric acid or only malonic acid.

One type of suitable copolymer is the fluoroolefin copolymer containing pendant hydroxyl groups in which the ratio of fluorine atoms to hydroxyl groups is 1:1 to 22:1, said copolymers containing between 6 and 65 percent by weight fluorine said copolymer having a number average molecular weight of between about 30,000 and 80,000 and a weight average molecular weight of between about 350,000 and 550,000. Copolymers of this type are disclosed in U.S. Pat. Nos. 3,429,845, 3,429,846 and U.S. Pat. No. 3,514,425. U.S. Pat. No. 3,429,846 discloses copolymers of tetrafluoroethylene, trifluorochloroethylene, vinylidene fluoride, hexafluoropropene, trifluoroethylene and vinyl fluoride with vinyl alcohol (polymerized and then hydrolyzed vinyl esters), lower secondary hydroxy alkyl vinyl ethers and hydroxycycloalkyl vinyl ether. U.S. Pat. No. 3,429,845 discloses copolymers of polymerizable fluoroolefins of the formula $CF_2=CXX'$ where X is F or Cl and X' is H, F, Cl, $R_f$ or $OR_f$, where $R_f$ is lower perfluoroalkyl with at least one omegahydroxy aliphatic vinyl ether of 3 to 13 chain atoms with the overall ratio of fluoroolefin to vinyl ether being about 1:1. U.S. Pat. No. 3,514,425 discloses copolymers of fluoroolefins having the formula $CF_2=CFX$ where X is F or Cl with allyl alcohol or methallyl alcohol in which the ratio of alcohol to fluoroolefin is 3:1 to 20:1. A second type of suitable copolymer is the copolymer of hydroxy lower alkyl methacrylate or hydroxy lower alkyl acrylate and at least one lower alkyl acrylate or lower alkyl methacrylate, said copolymer containing between about 10 and 60 mol percent hydroxy lower alkyl methacrylate or hydroxy lower alkyl acrylate. A third type of suitable polymer is one containing glycidyl methacrylate units or glycidyl acrylate units, said polymer may optionally contain units of one or more members of the class consisting of lower alkyl acrylate or lower alkyl methacrylate, said polymer containing at least 10 mol percent glycidyl methacrylate or glycidyl acrylate units. (The term "lower alkyl" as used in the specification and claims means an alkyl group containing 1 to 6 carbon atoms.)

The amount of multicarboxylic acid in the coating solution should be such that the number of carboxyl groups in the solution is at least about one-quarter of the number of pendant hydroxyl groups or glycidyl groups in the preformed polymer. There is little or no advantage in having more than about twice the number of carboxyl groups in the coating solution as there are pendant hydroxyl groups or glycidyl groups.

The multicarboxylic acid employed in the present invention is believed to react with the pendant hydroxyl groups or glycidyl groups of the polymer to form polyester linkages. In order for the reaction to proceed quickly and at moderate temperature, it is desirable to include an esterification catalyst. Suitable catalysts are strong nonvolatile acids, such as paratoluene sulfonic acid, sulfuric acid, hydroxymethyl sulfonic acid and the simple and chelated esters of orthotitanic acid. The orthotitanic acid esters are sold commercially under the name Tyzor. When the polymer contains glycidyl groups an amine catalyst preferably a tertiary amine catalyst such as N,N'-dimethyl octyl amine may be used. The amount of catalyst employed may vary over wide ranges, but an amount of about 0.05 to 3% by weight is usually satisfactory for most coating solutions. In most cases, the catalyst can be added directly to the coating solution prior to applying the coating solution to the surface to be coated. However, it is also possible to apply the catalyst to the substrate and then apply the coating solution to the substrate.

The preformed polymer and the multicarboxylic acid are dissolved in a suitable solvent or group of compatible solvents. Generally, alcohols are satisfactory solvents. Secondary and tertiary alcohols are preferred, and the most preferred is a mixture of secondary and tertiary butanol. The preformed polymer and multicarboxylic acid are preferably dissolved in the solvent in an amount such that the solids content of the solution is about 5 to 70 percent by weight, but the preferred solids content will vary with the molecular weight of the copolymer and each multicarboxylic acid, and will vary still further depending on how the coating is to be applied. A solution viscosity in the range of 10 to 50 centipoises at 25° C. is suitable for most coating operations.

The coating solutions are suitable to coat many different kinds of substrates, both metallic and nonmetallic. Among suitable substrates that may be coated with the coating solutions are, wood, glass, polymethyl methacrylate, polyesters such as polyethylene terephthalate, polyamides, polycarbonates, polyvinyl chloride, polystyrene, the ABS resins which are blends of copolymers of acrylonitrile, butadiene and styrene. The coatings are useful to give mar resistant surfaces on windows, skylights, windshields, lenses, etc.

The coating thickness on the substrate can be varied by increasing the viscosity of the coating solution, or by repeated coatings. The usual coating thickness for a coating obtained by dipping is about 2 to 6$\mu$, but coating up to 20$\mu$ can be obtained by repeated dipping and curing operations.

The Test Methods employed in the Examples are as follows:

A. OPTICAL PROPERTIES

Haze and luminous transmittance are determined by a Gardner Automatic Photometric Unit (ASTM D-1003-61).

B. ABRASION RESISTANCE

Abrasion resistance is determined by three methods.

1. Hand rubbing surface with No. 0000 grade steel wool and examining visually for abrasion.
2. Wet Air Cleaner Test Dust wiping test (WACTD)

The resistance of the coatings to abrasion by wet, granular abrasives is determined by abrading a 2" × 2" area of a test panel in a special wiping tester designed to operate at 60 strokes per minute.

The abrasive slurry is prepared by mixing equal weights of water and Air Cleaner Test Dust (fine grade) obtained from the AC Spark Plug Division of General Motors. The resulting slurry is kept well mixed and used within eight hours of preparation. A pool of the abrasive slurry approximately 2 inches in diameter is poured onto the test area and wiped for 180 strokes (3 minutes) with a watersaturated felt pad wrapped around the curved surface of a 2" diameter cylindrical mandrel two inches wide loaded to a total of 500 g. The wiping pressure is about 1 psi. The degree of abrasion is determined by measuring the change in transmitted haze ($\Delta$% H) resulting from the wiping.

3. Steel Wool Abrasion Resistance (SWAR). The sample to be tested is placed in a device which consisted of a rotating foot (1 in$^2$), a platform to support weight above the foot and handle that permits the assembly to be rotated.

A pad of steel wool of sufficient size to cover the foot of the abrader about 1.2" in diameter and of uniform thickness is cut from a fresh roll of No. 0000 grade steel wool (such as Beaver Grade by James H. Rhodes & Co.). The pad is placed on the sample and under the foot. A known weight is placed on the platform above the foot to give a known pressure on the foot (1 – 10 kg/in$^2$). This assembly is rotated 5 revolutions at about 1 rev./sec.; the weight is removed from the platform and the test panel and steel wool removed from the abrader. The % haze is then measured in the abraded area. The difference between the haze after abrasion minus the initial unabraded haze gives the delta ($\Delta$)% haze. The lower the $\Delta$% haze the better the abrasion resistance.

C. ADHESION

Adhesion is measured by the following procedures:

1. Scratch a 9-square (8 line) retangular grid in approximately a ½" × ½" area through coating.

2. Scour with No. 0000 steel wool to remove surface debris.

3. Using Scotch Brand Transparent Tape. No. 600, the tape is firmly pressed onto the grid and removed by a quick pull, keeping the tape at about 90° to the panel surface.

4. Repeat (3) twice.

5. Examine carefully and rate as follows:

| Result | Rating |
| --- | --- |
| All coating removed | 0% – Poor |
| 1 Square remaining | 10% – Poor |
| 5 Squares remaining | 50% – Good |
| 9 Squares remaining but chip-back at edges of grid lines | 90% – Excellent |
| No chip-back of any kind | 100% – Excellent |

D. COATING THICKNESS

This was determined by an interferometric technique as described by:

M. F. Bechtold, Journal of the Optical Society of America, 37, (1947), pp 873–878.

E. SOLUTION VISCOSITY

Brookfield Viscometer (Model LVF) routinely used with No. 1 spindle at 60 RPM, temperature corrected to 25° C.

The following Examples illustrate the invention, and together with the remainder of the specification disclose the best mode of carrying out the invention. In the Examples, all parts and percentages are by weight unless otherwise specified.

EXAMPLE 1

A coating solution was prepared as follows:

```
100 g   tetrafluorethylene/ 4-hydroxybutyl vinyl
        ether (1:1) copolymer solution in butanol
        (about 11% solids),
2.5 g   malonic acid dissolved in 30 ml of ethanol
20 g    acetic acid
0.01 g  (one drop) L-520 Silicone leveling agent,
        an organosilicone which is a block co-
        polymer of one or more lower alkylene
        oxides with dimethyl siloxane (product
        of Union Carbide).
10 g    methyl isobutyl ketone
0.64 ml of 20% (wt.) solution of para-toluene
        sulfonic acid in isopropanol.
```

This solution was clear and colorless. Panels of a commercially available polymethyl methacrylate were dip coated (1 minute contact time), dried 45 minutes at 25% relative humidity and cured in an air circulating oven at 170° C. for 30 minutes.

The cured coated substrate had good optical properties, excellent adhesion by the tape pull test, and moderate abrasion resistance to 0000 grade steel wool (hand rubbing).

Two other samples were cured at 135° C. for 45 minutes and 135° C. for 120 minutes respectively. Moderate abrasion resistance to hand rubbing with 0000 grade steel wool was observed with both samples. These observations showed that the coating cured under very mild conditions.

A cast film of the above coating solution was prepared on Teflon. The film was cured in an air circulating oven at 135° C/30 minutes. The cured film was then removed from the Teflon by peeling and an infrared spectrum obtained. This spectrum confirmed the presence of esters (band at 5.7µ) and the absence of acid (broad band at 3 - 4µ).

To obtain more quantitative data on abrasion resistance, the standard steel wool ratary abrasion test method was used on the above described samples. A Δ% haze of 7.4 was obtained with a 4 kg. wt. on the platform, uncoated acrylic has a Δ% haze of ~24 under similar test conditions.

EXAMPLE 2

A coating solution was prepared as follows:

```
50 g   tetrafluoroethylene/4-hydroxy butyl vinyl
       ether (1:1) copolymer solution in butanol
       (11% solids)
10 g   acetic acid
 5 g   methyl isobutyl ketone
 1 drop L-520 Silicone (leveling agent)
 2 ml  20 wt. % p-toluene sulfonic acid in
       isopropanol
2.29 g citric acid monohydrate in 30 ml absolute
       ethanol
```

A clear colorless solution resulted. Commercially available polymethyl methacrylic panels were dip coated (1 min. contact) quickly withdrawn by hand, dried 30 min. at 30% R.H. One sample was cured at 135° C. for 30 minutes. One sample was cured at 135° C. for 4 hours. One sample was cured at 170° C. for 30 minutes. One sample was cured at 170° C. for 4 hours.

All of the coated cured panels showed excellent optical properties; 91.8 – 93.7% transmission, 1.7 – 0.2% haze. Abrasion resistance to steel wool (No. 0000) by the SWAR test was good. These data confirmed that citric acid is an effective crosslinker for this copolymer, and that the system cured under mild conditions to give a useful coating.

Infrared spectra of cast films of the above coatings prepared as in Example 1, confirmed the presence of esters.

EXAMPLE 3

The following coating solution was prepared:

```
2250 g  tetrafluoroethylene/4-hydroxybutyl vinyl
        ether 1:1 copolymer solution in butanol
        (11% solids)
 95.3 g anhydrous citric acid (predried overnight 60°C., 20" vac., N₂ bleed)
 675 g  absolute ethyl alcohol
 450 g  acetone (reagent grade)
  9.0 g 10 wt. % L-520 Silicone leveling agent
        in n-butanol
  36 g  20 wt. % p-toluene sulfonic acid in
        isopropanol
```

After thorough mixing, the solution viscosity was found to be 27.4 cps. determined using standard Brookfield method (60 RPM, No. 1 spindle), corrected to 25° C.

Sixteen 12" × 16" × 3/16" commercially available acrylic panels were dip coated at withdrawal rate of 35"/min. All coated panels were air dried at least 25 min., and cured in air circulating ovens. Eight panels were cured at 105° C. for 2 hours, and eight panels were cured at 135° C. for 2 hours.

Extensive testing of these coatings were made. These tests included:
a. initial abrasion resistance/adhesion
b. hydrolytic stability
c. weatherability
d. thermoformability
e. chemical resistance
f. alkali soap resistance.

Initial abrasion resistance was very good. The steel wool (No. 0000) rotary abrasion resistance gave a 10 kgΔ% haze of 3.9 to 4.9%, depending on cure condition. The panels cured at 105° C. were less abrasion resistant. Coating adhesion was 100% by the Scotch grid tape pull test. The coating was transparent (93.2 – 93.4% transmission/0.4% haze). The coating was ~5.4µ thick at 8 inches below the coating line. The coated panels showed excellent abrasion resistance under the conditions of the WACTD wiping test.

The hydrolytic stability was determined in two ways; (1) determination of retention of abrasion resistance with exposure to 35° C/~95% R.H. in a climate chamber, and (2) retention of abrasion resistance with exposure to ~100% R.H. at room temperature. Both of these tests indicated this coating has excellent retention of abrasion resistance upon exposure to moisture. After 3 weeks exposure to 35° C/~95% R.H. the WACTD wipe test indicated no loss of initial abrasion resistance. No loss of coating adhesion was observed. After 8 weeks exposure to 100% R.H./ room temperature, again no loss in initial abrasion resistance by the WACTD wipe test was detected. A slight loss in steel wool abrasion resistance was observed after 8 weeks.

The coating showed excellent retention of both abrasion resistance and adhesion on accelerated weathering in a carbon arc XW Weather-ometer. After 1,000 exposure hours, the steel wool abrasion resistance was unchanged, and adhesion was excellent.

Coated strips 3" × 26" × ¼" were thermoformed on a test mandrel having a minimum radius of curvature of 0.7". The coated strips were heated to 135° C. and formed. No stress cracks were observed indicating excellent thermoformability.

The chemical resistance of this coating is superior to an uncoated acrylic surface. A 16 hour exposure to 40% sulfuric acid, or 2% Fels-Naphta soap caused no change in appearance or abrasion resistance. A 16-hour exposure to methanol caused the coating to swell slightly causing an optical distortion, however, abrasion resistance was uneffected. Acetone attacked the coating causing swelling of the exposed substrate after 16-hour exposure. A one-hour exposure to a saturated salt solution at 60° C. did not effect the coating. A 2-hour exposure to Top Job cleaning solution did not effect the coating optically nor was any decrease of abrasion resistance noted.

A thin layer of Fels-Naphta soap was smeared onto one side of a coated panel and the panel was kept at ~100% R.H. for 16 hours at room temperature. No decrease in abrasion resistance resulted, adhesion remained excellent.

The accelerated weathering properties were somewhat better for the samples cured at 135° C. then for the samples cured at 105° C.

EXAMPLE 4

Charged to a 100 ml round bottom flask with side arm;

```
 8.34 g anhydrous citric acid
 2.91 g 2,2-bis-(hydroxymethyl)-propoinic acid
 0.1 g  p-toluene sulfonic acid (catalyst)
67.76 g t-butanol solvent
```

The reaction mixture was heated with agitation to reflux (~86° C) and held for 2 hours. The mixture was then cooled to room temperature; a clear colorless solution resulted.

The following coating solution was prepared:

| | |
|---|---|
| 150 g | tetrafluorethylene/4-hydroxybutyl vinyl ether (1:1) copolymer solution in butanol (11% solids) |
| 42.3 g | of the above produced solution of the citric acid-2,2-bis(hydroxymethyl)-propionic acid reaction product |
| 0.6 g | 10 wt. % L-520 Silicone in n-butanol |
| 2.4 g | 20 wt. % p-toluene sulfonic acid in isopropanol |
| 50 g | acetone |

This solution had a viscosity of 23.4 cps at 25° C.

Commercially available acrylic panels were dip coated in this solution at a withdrawal rate of 30"/min. The panels were then dried 30 min. at 15% relative humidity; and cured in air circulating ovens at 105° C/2 hours and 135° C/2 hours.

The cured panels showed good abrasion resistance to steel wool and adhesion was excellent.

| Cure Conditions (°C/hours) | Initial (%Trans.) | (%Haze) | SWAR* (Δ% Haze) | WACTD (Δ% Haze) | Adhesion (% retention) |
|---|---|---|---|---|---|
| 105°/2 hours | 93.5 | 0.4 | 3.3 | 1.4 | 95 |
| 135°/2 hours | 93.5 | 0.3 | 2.3 | 1.5 | 95 |

*10 kg. on platform

EXAMPLE 5

The following materials were charged to the same reactor as Example 4.

| | |
|---|---|
| 2.45 g | tris (hydroxymethyl) acetic acid |
| 8.80 g | anhydrous citric acid |
| 0.1 g | p-toluene sulfonic acid |
| 63.75 g | t-butanol |

This mixture was heated to reflux (~86° C) and held for 2 hours. The mixture was then cooled to room temperature; a clear colorless solution resulted.

The following coating solution was prepared:

| | |
|---|---|
| 150 g | tetrafluoroethylene/4-hydroxybutyl vinyl ether (1:1) copolymer solution in butanol (11% solids) |
| 42.3 g | of the above prepared solution |
| 0.6 g | 10 wt. % L-520 Silicone in n-butanol |
| 2.4 g | 20 wt. & p-toluene sulfonic acid in isopropanol |
| 50 g | acetone |

Commercially available acrylic panels were coated, dried and cured as described in Example 4. The cured coatings showed good abrasion resistance and adhesion.

| Cure Conditions (°C/Hours) | Initials (% Trans.) | (% Haze) | SWAR* (Δ% Haze) | Adhesion (% retention) |
|---|---|---|---|---|
| 105/2 | 93.5 | 0.4 | 4.1 | 95 |
| 135/2 | 92.5 | 0.6 | 4.6 | 75 |

*10 kg. on platform

EXAMPLE 6

To a 1,000 ml resin kettle was charged:

| | |
|---|---|
| 300 g | benzene |
| 6.0 g | glycidyl methacrylate |
| 54.0 g | methyl methacrylate |
| 0.35 ml | lauryl mercaptan |
| 0.1 g | Vazo 64, a commercially available azobis-isobutyronitrile vinyl polymerization initiator |

The mixture was heated to 83° C. and held for 2 hours. It was then cooled to room temperature; a clear colorless solution resulted.

A coating solution was prepared from the above polymer solution.

| | |
|---|---|
| 24.0 g | the copolymer solution |
| 0.2 g | citric acid dissolved in 15 g acetone |
| 1 drop | L-520 Silicone leveling agent |

Commercially available acrylic panels were dip coated, 1 minute contact, in the above coating solution, dried 30 min/ ≤ 30% R.H. and cured at 135° C/60 minutes. The cured coating had 90.3% transmission, showed good abrasion resistance, and excellent adhesion.

The SWAR test gave a Δ% haze of 8.5 with 2 kg. on the platform. Uncoated acrylic shows Δ% haze of ~22 under these test conditions.

The abrasion resistance of this type of coating can be improved by (1) increasing the glycidyl methacrylate content of the copolymer, and (2) by using tertiary amine catalysts. The preferred catalyst contains a long chain, such as N,N'-dimethyl octyl amine. Optical properties can be improved by using a terpolymer of glycidyl methacrylate/methyl methacrylate/methyl acrylate.

EXAMPLE 7

To a 500 ml resin kettle was charged:

| | |
|---|---|
| 36.2 g | glycidyl methacrylate (GMA) |
| 12.8 g | uninhibited methyl methacrylate (MMA) |
| 11.0 g | methyl acrylate (MA) |
| 130.0 g | benzene |
| | To this was added 0.45 g of Vazo 64 dissolved in 10 g of benzene. |

With agitation the temperature was increased to 75° C. and maintained for 2 hours. The polymer formed contained ~60% GMA/24% MMA/16% MA and was isolated by precipitating it in methanol and filtering. The terpolymer had an inherent viscosity in chloroform of 0.78 at room temperature and a glass transition temperature of about 70° C.

Undried polymer filtrate from above was used in the following coating solution.

2.5 g undried polymer
10 g benzene
10 g acetone
10 g ethyl acetate
0.56 g citric acid monohydrate dissolved in
    5 g acetone
2 drops L-520 Silicone Commercially available acrylic panels were dip coated, dried, and cured at 110° C/2 hours and 135° C/2 hours. The cured coating showed good optical properties, good steel wool abrasion resistance and excellent to moderate adhesion.

| Cure Conditions (20 C/hours) | Initial (% Trans) | (% Haze) | 4 kg. SWAR (Δ% Haze) | Adhesion |
|---|---|---|---|---|
| 110°/2 hour | 91.4 | 1.4 | 3.0 | Excellent |
| 135°/2 hour | 90.6 | 1.5 | 2.0 | Moderate |

EXAMPLE 8

To a 500 ml resin kettle was charged:

29.8 g glycidyl methacrylate (GMA)
4.5 g methyl acrylate (MA)
15.7 g methyl methacrylate (MMA)
150 g benzene
To this was added 0.375 g of Vazo 64 dissolved in
6.7 g of benzene The mixture was heated to 75° C. with agitation and held for about 2 hours. The terpolymer composition was about 58.4% GMA/34.8% MMA/6.9% MA; $n_I$ = 0.38 in chloroform at room temperature and the $T_g$ was about 56° C. The polymer was separated by methanol precipitation and filtration. The following coating solution was prepared from the above polymer:

3.0 g the above polymer
15.0 g acetone
15.0 g benzene
1.18 g anhydrous citric acid dissolved in
    10 grams of acetone
2 drops L-520 Silicone Acrylic panels were dip coated, dried, and cured to give coatings, then 0.1 g of N,N'-dimethyl octyl amine (an esterfication catalyst) in 5 ml of acetone was added to the coating solution and additional acrylic panels were dip coated, dried and cured. The results and conditions of cures are shown in the following Table:

| Cure Conditions (°C/hours) | Initial (% Trans.) | (% Haze) | SWAR** (Δ% Haze) | Adhesion |
|---|---|---|---|---|
| 135°C/2 hours | 89.7 | 0.4 | 1.2 | Moderate |
| 135°C/2 hours* | 87.7 | 12.4 | 0.1 | Excellent |

*Catalyst in coating solution
**4 kg. on platform

EXAMPLE 9

A copolymer of 2-hydroxy ethyl methacrylate and methyl methacrylate was prepared as follows:

To a 1 lit. resin kettle was charged:

20.0 g 2-hydroxy ethyl methacrylate
20.0 g methyl methacrylate
100.0 g absolute methanol
0.25 g lauryl mercaptan
To this was added 0.1 g Vazo 64 in 60 grams of
absolute methanol.

The mixture was heated with agitation to reflux, and held for 3 hours. The product solution was then cooled to room temperature. The product solution contained ~15.9% solids.

A coating solution was prepared from the above solution.

12.6 g of above solution
15.0 g acetone
5.7 g citric acid monohydrate dissolved in
    25 ml absolute ethanol
1.0 ml of 20 wt. % p-toluene sulfonic in
    isopropanol
1 drop L-520 Silicone Acrylic panels were dip coated, dried, and cured. Coatings with excellent optical properties were obtained at cures of 100° C/2 hours or 135° C/1 hour. The higher cure temperature gave significantly improved abrasion compared to uncoated acrylic.

| Cure Conditions °C/hours | Initial % Trans. | % Haze | SWAR* Δ% Haze | Adhesion |
|---|---|---|---|---|
| 100°C/2 hours | 92.8 | 0.2 | 41.4 | poor |
| 135°C/2 hours | 92.3 | 0.2 | 5.4 | poor |

*2 kg. on the platform

Uncoated acrylic panels show a Δ% haze of about 22% under these test conditions.

EXAMPLE 10

A coating solution was prepared as follows:

```
50 g    tetrafluoroethylene/4-hydroxybutyl vinyl
        ether (1:1) copolymer solution in butanol
        (11% solids)
15 g    methyl isobutyl ketone
2.29 g  citric acid monohydrate in 25 ml absolute
        ethanol
2 drops L-520 Silicone
10 g    ethyl acetate
1 ml    20 wt. % p-toluene sulfonic acid in
        isopropanol
```

Commercially available polycarbonate sheet panels were dip coated in the above solution, dried, and cured at 120° C. for 18 hours. (Polycarbonate is the generic name for the condensation polymer of Bisphenol A and phosgene).

The following properties were obtained:

| % Trans. | | % Haze | SWAR* (Δ%H) | Adhesion |
|---|---|---|---|---|
| 83.9 | | 2.1 | 1.5 | Excellent |
| 82.8 | Uncoated control | 1.7 | 15.4 | — |

*4 kg. on the platform

This coating shows good abrasion resistance and adhesion on a polycarbonate substrate. Incorporation of ultra violet absorbers in the coating increased the retention of coating adhesion with exposure to ultra violet light.

Samples of flame treated polyethylene terephthlate film were dip coated in the solution of Example 10, dried, and cured at 100° C/2 hours and 135° C/2 hours. The coated films had very good properties.

| Cure Conditions (°C/hours) | SWAR* Δ% Haze | Adhesion |
|---|---|---|
| 100°/2 hr. | 0.1 | Excellent |
| 135°C/2 hr. | 1.3 | Excellent |
| Uncoated control | 17.3 | — |

*4 kg. on the platform

I claim:

1. A coating composition comprising a solution in a compatible solvent of (I) at least one multicarboxylic acid selected from the class consisting of (a) citric acid, (b) malonic acid, (c) the acid ester reaction product of citric acid and a polyhydroxy aliphatic acid having up to 6 carbon atoms and (d) the acid ester reaction product of malonic acid and a polyhydroxy aliphatic acid having up to 6 carbon atoms; (II) a fluoroolefin copolymer containing pendent hydroxyl groups in which the rate of fluorine atoms to hydroxyl groups is 1:1 to 22:1, said copolymer containing between 6 and 65% by weight fluorine and having a number average molecular weight of between about 30,000 and 80,000 and a weight average molecular weight of between about 350,000 and 500,000; and (III) an esterification catalyst comprising a strong nonvolatile acid; the amount of multicarboxylic acid present in the coating composition being such that the number of carboxyl groups is at least about one-fourth of the number of pendent hydroxy groups in the fluoroolefin copolymer.

2. The composition of claim 1 in which the catalyst is strong nonvolatile acid selected from the class consisting of paratoluene sulfonic acid, sulfuric acid, hydroxy methyl sulfonic acid and simple and chelated esters of orthotitanic acid.

3. The composition of claim 2 in which the multicarboxylic acid is citric acid and the preformed fluoroolefin copolymer is a copolymer of tetrafluoroethylene and a hydroxy alkyl vinyl ether.

4. The composition of claim 3 in which the alkyl group in the hydroxyalkyl vinyl ether contains from 1 to 4 carbon atoms.

5. The composition of claim 3 in which the hydroxy alkyl vinyl ether is 4-hydroxybutyl vinyl ether.

6. The coating composition of claim 1 in which the ingredients listed are dissolved in a compatible organic solvent.

7. The coating composition of claim 1 in which the organic solvent comprises alcohol.

8. The coating composition of claim 7 in which the solvent comprises at least one secondary alcohol.

9. The composition of claim 8 in which the solvent comprises a mixture of secondary and tertiary alcohols.

10. The composition of claim 1 in which the multicarboxylic acid is citric acid, the copolymer is 1:1 copolymer of tetrafluoethylene and 4-hydroxybutyl vinyl ether, which are dissolved in a mixture of secondary butanol and tertiary butanol, said coating composition also containing about 0.1 to 3 wt. percent paratoluene sulfonic acid.

11. The coating composition of claim 1 in which the multicarboxylic acid is the acid ester reaction product of citric acid and 2,2-bis-(hydroxy methyl)-propionic acid in which the mol ratio of citric acid to 2,2-bis-(hydroxy methyl)-propionic acid is greater than about 0.5 to 1.

12. The coating composition of claim 1 in which the multicarboxylic acid is the acid ester reaction product of citric acid and tris (hydroxymethyl) acetic acid in which the mol ratio of citric acid to tris (hydroxymethyl) acetic acid is greater than about 0.5 to 1.

* * * * *

PO-1050
(5/69)

UNITED STATES PATENT OFFICE
CERTIFICATE OF CORRECTION

Patent No. 3,819,562      Dated June 25, 1974

Inventor(s) Paul D. Cargagna

It is certified that error appears in the above-identified patent and that said Letters Patent are hereby corrected as shown below:

The inventors' name which reads "Paul D. Cargagna" should be corrected to read as follows: Paul D. Carfagna.

Signed and sealed this 1st day of October 1974.

(SEAL)
Attest:

McCOY M. GIBSON JR.
Attesting Officer

C. MARSHALL DANN
Commissioner of Patents